United States Patent
Benoit et al.

(10) Patent No.: US 10,237,305 B2
(45) Date of Patent: Mar. 19, 2019

(54) METHODS AND SYSTEMS FOR ENABLING LEGAL-INTERCEPT MODE FOR A TARGETED SECURE ELEMENT

(71) Applicant: NAGRAVISION S.A., Cheseaux-sur-Lausanne (CH)

(72) Inventors: Bernard Benoit, Renens (CH); Jean-Claude Fournier, Noyal-sur-Vilaine (FR); Laurent Gauteron, Evian (FR); Yishan Zhao, Antony (FR); Francois Fer, Domloup (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 290 days.

(21) Appl. No.: 15/182,461

(22) Filed: Jun. 14, 2016

(65) Prior Publication Data

US 2017/0237780 A1  Aug. 17, 2017

Related U.S. Application Data

(60) Provisional application No. 62/296,194, filed on Feb. 17, 2016.

(51) Int. Cl.
*H04L 29/06* (2006.01)
*H04W 12/04* (2009.01)
*H04L 9/08* (2006.01)

(52) U.S. Cl.
CPC .......... *H04L 63/306* (2013.01); *H04L 9/0816* (2013.01); *H04L 9/0838* (2013.01);
(Continued)

(58) Field of Classification Search
None
See application file for complete search history.

(56) References Cited

U.S. PATENT DOCUMENTS 5,832,089 A * 11/1998 Kravitz .................. G06Q 20/02
705/69
6,704,871 B1 * 3/2004 Kaplan ................... G06F 21/72
713/192

(Continued)

FOREIGN PATENT DOCUMENTS

WO        2003049357        6/2003

OTHER PUBLICATIONS

Tahir, Ruhma et al. A Scheme for the Generation of Strong ICMetrics based Session Key Pairs for Secure Embedded System Applications. 2013 27th International Conference on Advanced Information Networking and Applications Workshops. https://ieeexplore.ieee.org/stamp/stamp.jsp?tp=&arnumber=6550477 (Year: 2013).*

(Continued)

*Primary Examiner* — Jeremiah L Avery
(74) *Attorney, Agent, or Firm* — Oblon, McClelland, Maier & Neustadt, L.L.P.

(57) ABSTRACT

Disclosed herein are methods and systems for enabling legal-intercept mode for a targeted secure element. In an embodiment, a method includes embedding a first key-negotiation parameter associated with a target client device into an intercept secure encryption element; configuring an encryption-management device to receive the intercept secure encryption element and to receive a second key-negotiation parameter associated with the target client device and obtained from a service-provider system, the encryption-management device configured to embed the second key-negotiation parameter into the intercept secure encryption element; and providing the intercept secure encryption element to a communications-intercept system configured to obtain intercepted messages associated with the target client device, the intercepted messages comprising session-key-negotiation messages and associated data messages encrypted with a corresponding negotiated session
(Continued)

key, wherein the intercept secure encryption element is configured to (i) identify the negotiated session key based on the session-key-negotiation messages and the first and second key-negotiation parameters and (ii) decrypt the data messages with the negotiated session key.

20 Claims, 14 Drawing Sheets

(52) U.S. Cl.
CPC ............ *H04L 63/06* (2013.01); *H04L 63/205* (2013.01); *H04W 12/04* (2013.01); *H04L 2209/80* (2013.01)

(56) References Cited

U.S. PATENT DOCUMENTS

| | | | |
|---|---|---|---|
| 6,738,902 B1 | 5/2004 | Ruppert | |
| 7,181,017 B1* | 2/2007 | Nagel | H04L 9/0825 380/282 |
| 7,231,517 B1* | 6/2007 | Mashayekhi | H04L 63/045 709/229 |
| 2001/0002486 A1* | 5/2001 | Kocher | G06F 7/723 713/171 |
| 2005/0063544 A1* | 3/2005 | Uusitalo | H04L 63/06 380/277 |
| 2009/0220080 A1* | 9/2009 | Herne | H04L 63/0428 380/255 |
| 2009/0287837 A1* | 11/2009 | Felsher | G06F 19/328 709/229 |
| 2011/0016321 A1* | 1/2011 | Sundaram | H04L 63/061 713/171 |
| 2011/0142240 A1 | 6/2011 | Yoon | |
| 2012/0114124 A1* | 5/2012 | Du | H04L 9/083 380/278 |
| 2012/0272064 A1 | 10/2012 | Sundaram | |
| 2014/0380056 A1* | 12/2014 | Buckley | H04L 9/0847 713/171 |
| 2015/0288514 A1* | 10/2015 | Pahl | H04L 9/085 713/171 |
| 2016/0156626 A1* | 6/2016 | Roth | H04L 9/321 713/169 |

OTHER PUBLICATIONS

Maffina, M.A.; RamPriya, R.S. An Improved and Efficient Message Passing Interface for Secure Communication on Distributed Clusters. 2013 International Conference on Recent Trends in Information Technology (ICRTIT). https://ieeexplore.ieee.org/stamp/stamp.jsp?tp=&arnumber=6844225 (Year: 2013).*

Notification of Transmittal of the International Search Report and the Written Opinion of the International Searching Authority, or the Declaration, for PCT/EP2017/053613, dated Apr. 20, 2017, 13 pages.

* cited by examiner

METHODS AND SYSTEMS FOR ENABLING LEGAL-INTERCEPT MODE FOR A TARGETED SECURE ELEMENT

CROSS-REFERENCE TO RELATED APPLICATIONS

This application claims the benefit of U.S. Provisional Patent Application No. 62/296,194, filed Feb. 17, 2016 and entitled "Methods and Systems for Enabling Legal-Intercept Mode for a Targeted Secure Element," the entire contents of which is hereby incorporated herein by reference.

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld as may be the case for a walkie-talkie, body-mounted, or attached to a vehicle such as the roof of a car, as examples.

Given the relative ease with which radio signals can be intercepted, communication with, or between, personal mobile devices is often encrypted to prevent interception of the communication by third parties. Generally speaking, encryption is the process of converting audible voice or other data into unintelligible data, while decryption is the process of converting the unintelligible data back to the original e.g., audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

Although many forms of communication may be encrypted, government agencies, such as the NSA, may obtain authorization to listen in on communication sessions for various reasons, such as criminal activity, suspicions of terrorism, etc.

OVERVIEW

Described herein are methods and systems for enabling legal-intercept mode for a targeted secure element. One embodiment takes the form of a method including the steps of embedding a first key-negotiation parameter associated with a target client device into an intercept secure encryption element; configuring an encryption-management device to receive the intercept secure encryption element and to receive a second key-negotiation parameter associated with the target client device and obtained from a service-provider system, the encryption-management device configured to embed the second key-negotiation parameter into the intercept secure encryption element; and providing the intercept secure encryption element to a communications-intercept system configured to obtain intercepted messages associated with the target client device, the intercepted messages including session-key-negotiation messages and associated data messages encrypted with a corresponding negotiated session key, where the intercept secure encryption element is configured to (i) identify the negotiated session key based on the session-key-negotiation messages and the first and second key-negotiation parameters and (ii) decrypt the data messages with the negotiated session key.

In some embodiments, the method further includes configuring the encryption-management device to provide the first and second key-negotiation parameters to a target secure encryption element associated with the target client device.

In some embodiments, a target secure encryption element associated with the target client device is preconfigured with the first and second key-negotiation parameters.

In some embodiments, the negotiated session key is based on a first secret key associated with the target client device and a second secret key associated with a second client device, where a target secure encryption element associated with the target client device is selectively configured to use, as the first secret key, a pseudorandom secret key that is based on the first and second key-negotiation parameters. In some embodiments, each of the target secure encryption element and the intercept secure encryption element is configured with a respective pseudorandom generator that generates the pseudorandom secret key based on the first and second key-negotiation parameters. In some embodiments, the method further includes transmitting a configuration command to the target secure encryption element to selectively configure the target secure encryption element to generate the pseudorandom secret key. In some embodiments, either or both of the target secure encryption element and the intercept secure encryption element have at least one tamper-resistant safeguard.

In some embodiments, the method further includes configuring the encryption-management device to obtain the second key-negotiation parameter from the service-provider system responsive to receiving the intercept secure encryption element.

In some embodiments, the method further includes configuring the encryption-management device to obtain the second key-negotiation parameter via a user interface.

Another embodiment takes the form of a method that includes receiving an intercept secure encryption element containing an embedded first key-negotiation parameter associated with a target client device; obtaining, from a service-provider system, a second key-negotiation parameter associated with the target client device; embedding the second key-negotiation parameter into the intercept secure encryption element; obtaining intercepted messages associated with the target client device, the intercepted messages including session-key-negotiation messages and associated data messages encrypted with a corresponding negotiated session key; identifying, with the intercept secure encryption element, the negotiated session key based on the session-key-negotiation messages and the first and second key-negotiation parameters; and decrypting the data messages with the intercept secure encryption element and the negotiated session key.

In some embodiments, the method further includes providing the first and second key-negotiation parameters to a target secure encryption element associated with the target client device.

In some embodiments, a target secure encryption element associated with the target client device is preconfigured with the first and second key-negotiation parameters.

In some embodiments, the negotiated session key is based on a first secret key associated with the target client device and a second secret key associated with a second client device, where a target secure encryption element associated with the target client device is selectively configured to use, as the first secret key, a pseudorandom secret key that is based on the first and second key-negotiation parameters. In some embodiments, each of the target secure encryption element and the intercept secure encryption element is configured with a respective pseudorandom generator that generates the pseudorandom secret key based on the first and second key-negotiation parameters. In some embodiments, the method further includes transmitting a configuration command to the target secure encryption element to selectively configure the target secure encryption element to generate the pseudorandom secret key. In some embodiments, either or both of the target secure encryption element and the intercept secure encryption element have at least one tamper-resistant safeguard.

In some embodiments, the second key-negotiation parameter is obtained from the service-provided system responsive to receiving the intercept secure encryption element.

Another embodiment takes the form of a method that includes negotiating cryptographic session keys with remote devices using randomly generated secret keys, and encrypting and decrypting data with the negotiated session keys during communication sessions with the remote devices; and receiving and authenticating an intercept-mode command, and responsively negotiating a predictable cryptographic session key at least in part by: accessing a first key-negotiation parameter originating in a secure-encryption-element provider and a second key-negotiation parameter originating in a service provider; generating a pseudorandom secret key based on the first and second key-negotiation parameters; generating and sharing a first shared intermediate value based on the pseudorandom secret key; receiving a second shared intermediate value; generating the predictable cryptographic session key based on the pseudorandom secret key and the second shared intermediate value; and encrypting and decrypting data with the generated predictable cryptographic session key during a communication session with a remote device.

In some embodiments, the first shared intermediate value is generated using a discrete-logarithm function or an elliptical-curve function. In some embodiments, the discrete-logarithm function includes an exponential multiplication of the pseudorandom secret key into a product, followed by a modulo reduction of the product.

Furthermore, additional embodiments take the form of processor-based systems that include data storage containing instructions executable by the respective processor for causing the respective processor-based system to carry out functions including various combinations of the method steps recited above and elsewhere in this disclosure.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

BRIEF DESCRIPTION OF THE DRAWINGS

Various example embodiments are described herein with reference to the following drawings, in which like numerals denote like entities, and in which.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

In this disclosure, various elements of one or more of the described embodiments are referred to as modules that carry out, i.e., perform, execute, and the like, various functions described herein. As the term "module" is used herein, each described module includes hardware, e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes or at least has access to any necessary instructions executable for carrying out the one or more functions described as being carried out by the particular module; those instructions could take the form of or include hardware (i.e., hardwired) instructions, firmware instructions, software instructions, and/or the like, stored in any non-transitory computer-readable medium deemed suitable by those of skill in the relevant art in a given context and/or for a given implementation.

Figure 1A:
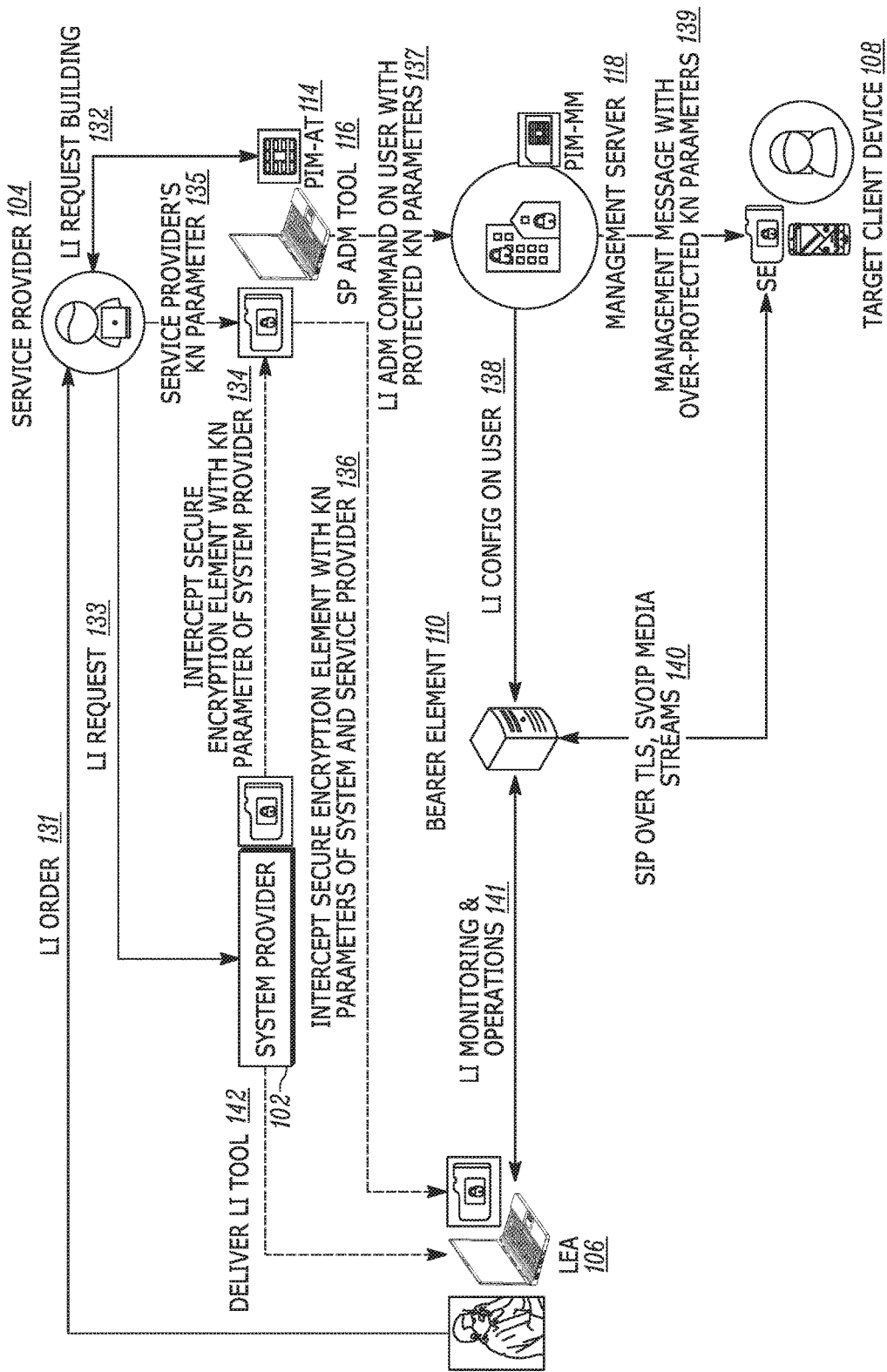
FIGS. 1A-1C depict example information flows, in accordance with some embodiments.
Figure 1B:
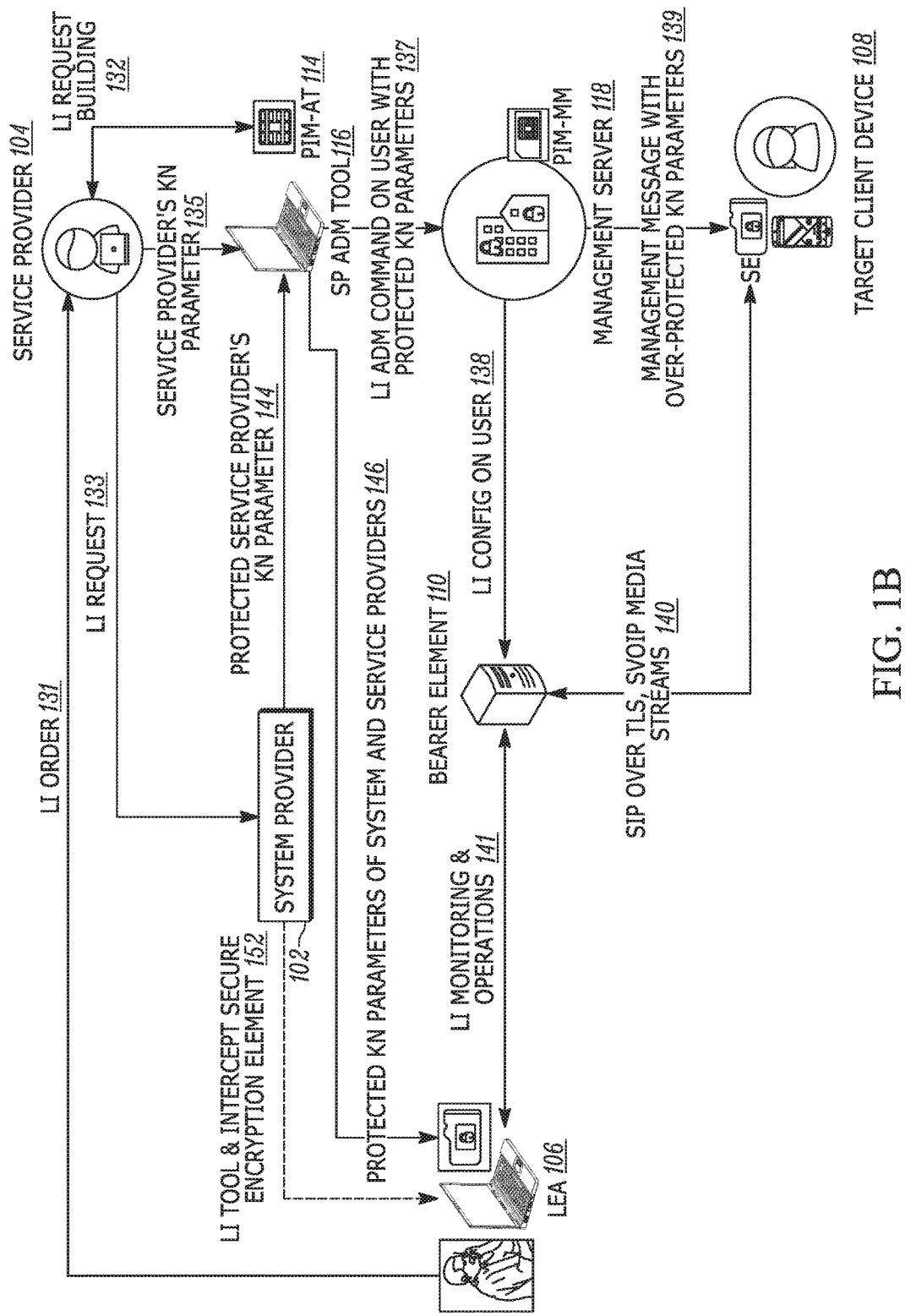
Figure 1C:
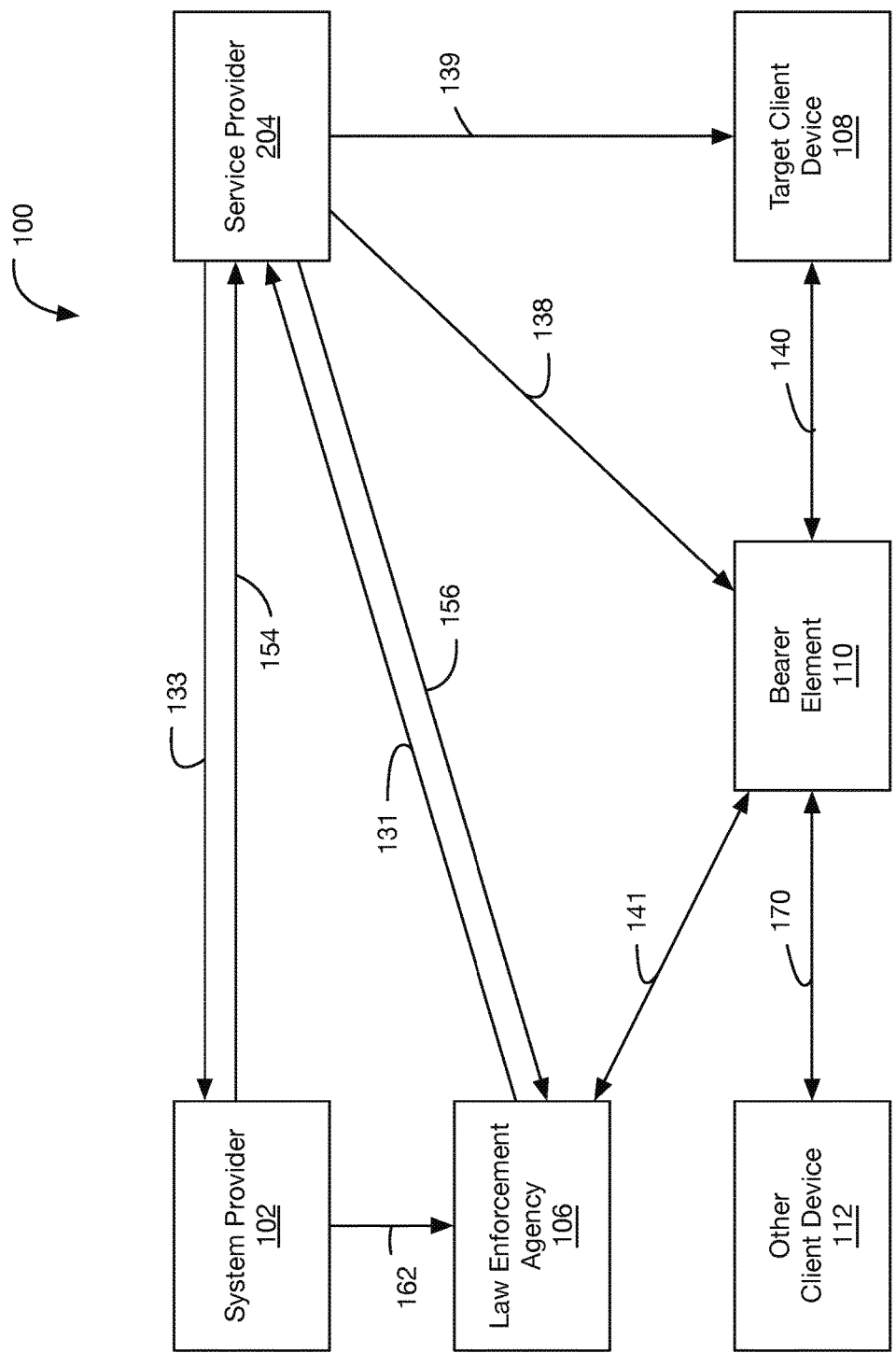

FIGS. 1A-1C depict example information flows, in accordance with some embodiments. In particular, FIG. 1A depicts a first example information flow, FIG. 1B depicts a second example information flow that is a slight variation on the first example information flow of FIG. 1A, and FIG. 1C depicts a third example information flow that in some ways generalizes the first and second example information flows of FIGS. 1A and 1B.

Some of the entities that are depicted in FIG. 1A are a system provider 102, a service provider 104, a law-enforcement agency (LEA) 106, a target client device 108, and a bearer element 110. In an embodiment, the system provider 102, the service provider 104, and the LEA 106 are three separate and distinct organizations. The system provider 102 may be a manufacturer and/or other provider of secure encryption elements such as the secure encryption elements described herein. The service provider 104 may be a provider of any suitable communications or telecommunications service such as but not limited to voice (e.g., VoIP) service, instant messaging service, video-conferencing service, and/or the like. The LEA 106 may be any LEA that is properly authorized to obtain and enforce legal-intercept (LI) orders (e.g. warrants) pertaining to various communications pursuant to valid court orders. Each of the system provider 102, the service provider 104, and the LEA 106 could be or include associated computer networks and/or systems that are associated with the respective separate organizations.

Also depicted in FIG. 1A are three entities that, in an embodiment, are under the control of—and in at least one embodiment may therefore be considered part of—the service provider 104; those three entities are a privileged identity management (PIM) administration tool (AT) (PIM-AT) 114, a service-provider administration tool 116, and a management server 118. It is further depicted in FIG. 1A that the management server 118 is associated with a module for sending and receiving PIM management messages (MM) (PIM-MM). In an embodiment, the service-provider administration tool 116 and the PIM-AT 114 may be implemented by a single or multiple computing devices such as servers or the like. Similarly, the management server 118 may be implemented as a networked server. The bearer element 110 may be implemented as a media gateway or other similar device that is equipped, programmed, and configured to serve as a node on a bearer path for packet-based communications and to carry out the other bearer-element functions described herein.

The target client device 108 could be a personal computer, a desktop computer, a laptop computer, a notebook computer, a tablet computer, a handheld computer, a smartphone, a cell phone, a wearable computer, a personal digital assistant (PDA), a feature phone, an optical head-mounted display (OHMD), and/or a smart watch, among numerous other possibilities that will be known to those of skill in the art. As is further described below and as is depicted by the "SE" icon near the target client device 108 in FIG. 1A, in at least one embodiment the target client device is associated with a target secure encryption element, which could be integral to the target client device 108 or could be communicatively coupled to the target client device 108 by a communication interface such as microSD, SIMM, or other suitable communication interface.

As shown in the first example information flow of FIG. 1A, an LI order is transmitted from the LEA 106 to the service provider 104 at arrow 131. In some embodiments, the LI order specifies one or more legal-interception-order parameters, including a subscriber identifier associated with a target client device such as the target client device 108. Next, an LI-request-building sequence is carried out at arrow 132 between the service provider 104 and the PIM-AT 114 that is associated with the service-provider administration tool 116. In some embodiments, this LI-request-building sequence includes generating an authenticable LI request that is cryptographically signed by the service-provider organization using PIM-AT 114, which may be a secure encryption element such as a microSD card. At arrow 133, this authenticatable LI request is sent from the service provider 104 to the system provider 102.

The system provider 102 may then authenticate the LI request, and then prepare what is referred to in this disclosure as an intercept secure encryption element (e.g., a microSD card) that contains data that is referred to in this disclosure as a first key-negotiation parameter, where that first key-negotiation parameter originates with the system provider 102 and would not be known nor accessible to the service provider 104. Next, at arrow 134, after embedding the first key-negotiation parameter in the intercept secure encryption element, the system provider 102 physically transmits (e.g., ships, hand-delivers, or the like) the intercept secure encryption element to the service provider 104 (and in particular, in the example shown in FIG. 1A, to the service-provider administration tool 116). As is shown at arrow 135, the service provider 104 then embeds a second key-negotiation parameter in the intercept secure encryption element. In at least one embodiment, the second key-negotiation parameter originates with the service provider 104 and would not be known to the system provider 102.

At arrow 136, the intercept secure encryption element (having both the first and second key-negotiation parameters embedded therein) is physically sent (e.g., shipped, hand-delivered, or the like) from the service provider 104 (e.g., as depicted in FIG. 1A, from the service-provider administration tool 116) to the LEA 106. At this point, then, the LEA 106 now has physical possession of the intercept secure encryption element with both the first and second key-negotiation parameters embedded therein. Next, at arrow 137, an LI-admin command is sent from the service-provider administration tool 116 to the management server 118. This LI-admin command may specify the subscriber associated with the target client device 108, the target client device 108, and/or one or more other surveillance-target-identifying pieces of information. Moreover, this LI-admin command may include or be sent along with protected (e.g., encrypted) copies of the first and second key-negotiation parameters. It is noted that the service provider 104 may not have access to the true value of the first key-negotiation parameter; as such, the intercept secure encryption element may be configured to output a protected version of one or both of the first and second key-negotiation parameters.

Next, at arrow 138, the management server 118 may transmit an LI-config command to the bearer element 110, notifying the bearer element 110 of the LI order that pertains to the target client device 108. This LI-config command may configure the bearer element 110 to provide a copy of the legally intercepted communication associated with the target client device 108 to the LEA 106 for decryption of the legally intercepted communication by the LEA 106, as further described below.

At arrow 139, the service provider 104 transmits, via the management server 118, an LI-mode instruction to a target secure encryption element associated with the target client device 108. In some embodiments, the management server 118 also transmits the first and second key-negotiation parameters to the target client device 108 (e.g., to the target secure encryption element). In alternative embodiments, the target secure encryption element is preconfigured with the first and second key-negotiation parameters, and the first and second key-negotiation parameters are selected by the service-provider organization and the first organization according to a serial number (or other identifier) associated with the target secure encryption element, for example. The instruction configures the target secure encryption element to transition from a first mode to an LI mode, according to which the target secure encryption element engages in communication that is encrypted in a predictable manner based on the first and second key-negotiation parameters, as is further described below.

At arrow 140, the target client device 108 (or the target secure encryption element via the target client device 108) sends encrypted signaling and/or media to and receives encrypted signaling and/or media from another endpoint (not shown in FIG. 1A or 1B) that is involved in a communication session with the target client device 108. In an embodiment, and as depicted in the example of FIG. 1A, this data could include session initiation protocol (SIP) over transport layer security (TLS), secure voice over IP (SVoIP), and/or one or more other suitable types of packet-based signaling and/or media data. At arrow 141, the LEA 106 legally intercepts this data by way of the bearer element 110, and proceeds to decrypt that intercepted data using the first and second key-negotiation parameters, and also using LI-decryption hardware and/or software tools that are provided to the LEA 106 by the system provider 102 at arrow 142, as described more fully below.

FIG. 1B depicts a second example information flow that is similar in many ways to the first example information flow of FIG. 1A. For brevity, the common aspects of FIGS. 1A and 1B are not described here; instead, several relevant differences between the example embodiments that are shown in FIGS. 1A and 1B are discussed here.

The first difference that is discussed here is that the arrow 134 from FIG. 1A is replaced by an arrow 144 in FIG. 1B. As described above, at the arrow 134 in FIG. 1A, after embedding the first key-negotiation parameter in the intercept secure encryption element, the system provider 102 physically transmits the intercept secure encryption element to the service-provider administration tool 116 at the service provider 104. At the arrow 144 in FIG. 1B, however, the system provider 102 transmits data to the service-provider administration tool 116 at the service provider 104, where that data includes a protected copy of the first key-negotiation parameter that is described above.

The second difference that is discussed here is that the arrow 136 from FIG. 1A is replaced by an arrow 146 in FIG. 1B. As described above, at the arrow 136 in FIG. 1A, the intercept secure encryption element (having both the first and second key-negotiation parameters embedded therein) is physically sent from the service-provider administration tool 116 of the service provider 104 to the LEA 106. At the arrow 146 in FIG. 1B, however, the service-provider administration tool 116 of the service provider 104 transmits data containing protected copies of both the first and second key-negotiation parameters to the LEA 106.

The third difference that is discussed here is that the arrow 142 from FIG. 1A is replaced by an arrow 152 in FIG. 1B. As described above, at the arrow 142 in FIG. 1A, the system provider 102 provides LI-decryption hardware and/or software tools to the LEA 106 for decryption of legally intercepted communications, as described more fully below. At the arrow 152 in FIG. 1B, however, the system provider 102 transmits both the LI-decryption tools and the intercept secure element to the LEA 106 for use by the LEA 106 in the decryption of legally intercepted communications. In other embodiments, the service provider 102 transmits the protected copy of the first key-negotiation secret directly to the LEA 106 without first sending the protected first key-negotiation secret to the service provider 104, in which case the service provider 104 would transmit to the LEA 106 only the protected copy of the second key-negotiation secret. And certainly other arrangements could be implemented as well.

Figure 2:
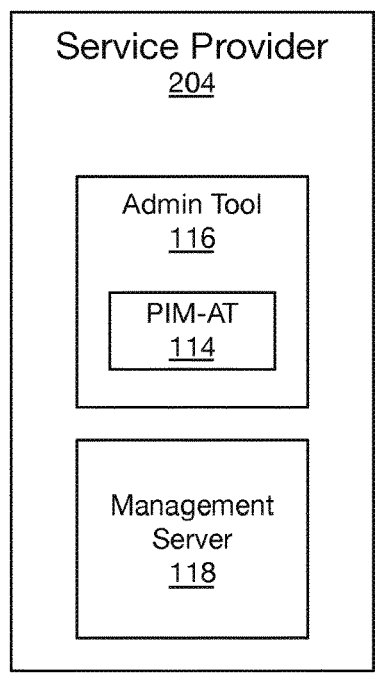
FIG. 2 depicts a block diagram of a service provider, in accordance with some embodiments.

As mentioned above, FIG. 1C depicts a third example information flow that in some ways generalizes the first and second example information flows of FIGS. 1A and 1B. As can be seen in FIG. 1C, the entities that are shown in FIG. 1C that are also shown in FIGS. 1A and 1B are the system provider 104, the LEA 106, the target client device 108, and the bearer element 110. Moreover, there are two additional entities that are shown in FIG. 1C that are not explicitly shown as such in either FIG. 1A or FIG. 1B. The first of two additional entities that are shown in FIG. 1C is the service provider 204 (which, as described more fully below and as depicted in FIG. 2, represents a combination of the service provider 104, the service-provider administration tool 116, the PIM-AT 114, and the management server 118). The second of the two additional entities that are shown in FIG. 1C is the other client device 112, which could be any suitable computing and/or communication device that is engaging in an intercepted session with the target client device 108 via the bearer element 110.

The information transmissions (e.g., messages, shipments and/or deliveries of secure encryption elements, etc.) that are shown in FIG. 1C that are also shown in FIGS. 1A and 1B are the arrows 131, 133, 138, 139, 140, and 141. There are four arrows that are depicted in FIG. 1C that are not explicitly depicted as such in FIG. 1A or FIG. 1B; these are the arrows 154, 156, 162, and 170. The arrow 154 is used as a general representation for either the arrow 134 in FIG. 1A or the arrow 144 in FIG. 1B. The arrow 156 is used as a general representation for either the arrow 136 in FIG. 1A or the arrow 146 in FIG. 1B. The arrow 162 is used as a general representation for either the arrow 142 of FIG. 1A or the arrow 152 in FIG. 1B. Lastly, the arrow 170 represents packet-based signaling and media data being exchanged between the other client device 112 and the bearer element 110 as part of the communication session between the target client device 108 and the other client device 112.

FIG. 2 depicts a block diagram of a service provider, in accordance with some embodiments. In particular, as described above, FIG. 2 depicts that, in an embodiment, the service provider 204 includes the service-provider administration tool 116, the PIM-AT 114, and the management server 118. The service provider 204 may include additional networks and/or entities as well.

Figure 3:
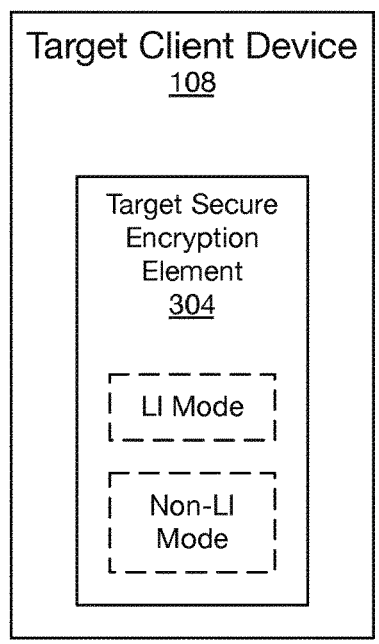
FIG. 3 depicts a block diagram of a target client device that includes a target secure encryption element, in accordance with some embodiments.

FIG. 3 is a block diagram of the target client device 108, in accordance with some embodiments. As shown, target client device 108 includes a target secure encryption element 304. In some embodiments, the target secure encryption element 304 may be composed of or at least include components soldered to a printed circuit board (PCB) in the target client device 108. Alternatively, the target secure encryption element 304 may be a microSD card, a subscriber identity module SIM card, or various other form factors that may be inserted into or otherwise communicatively connected with the target client device 108. As shown, the target secure encryption element 304 may be configured into an LI mode of operation or a non-LI mode of operation. When there is no LI session currently active for the target client device 108, the target secure encryption element 304 may operate in the non-LI mode. In the non-LI mode, unpredictable secret keys may be generated for use in a key-exchange procedure with the other client device 112. In some embodiments, the key-exchange procedure includes a Diffie-Hellman-type key exchange procedure. In the LI mode by contrast, predictable secret keys may be generated for use in a key-exchange procedure with the other client device 112.

If an LI order is received by the service provider 204, the target secure encryption element 304 may receive the LI-mode instruction and, in some embodiments, the first and second key-negotiation parameters, from the management server 118, and begin operating in the LI mode. In some embodiments, as mentioned above, operating in the LI mode includes generating predictable secret keys (also commonly referred to as private keys) using the first and second key-negotiation parameters as part of generating a shared session key during a key-negotiation process.

Thus, in LI mode, the secret keys are generated in a predictable manner, and may be predicted by the LEA 106 based on the first and second key-negotiation parameters. Once the secret key is obtained using the predictable manner, a shared session key may be reconstructed by the LEA 106 using the secret key and received key-negotiation messages, which contain intermediate values. Thus, while the target client device 108 communicates with the other client device 112 via the bearer element 110, the LEA 106 may legally intercept encrypted communication, and decrypt the intercepted communication using a negotiated session key that is predictably based on the first and second key-negotiation parameters, the decryption performed using the negotiated session key and the intercept secure encryption element. The obtained session key is the same session key generated by the target client device 108, enabling the LEA 106 to decrypt the legally intercepted encrypted communication.

In some embodiments, generating secret keys in a predictable manner includes generating secret keys according to a known function. In some embodiments, the known function may be a pseudo-random function. In some embodiments, the predictable manner includes iterating through a predefined sequence of secret keys. In some embodiments, the predefined sequence may be a pseudo-random sequence. In some embodiments, the predictable manner includes using a known function to generate a table index, and using secret keys from a predetermined table of secret keys according to the generated table index. In some embodiments, while operating in the LI mode, the target secure encryption element 304 generates pseudo-random keys for cryptography.

It is important to note, that even while operating in the LI mode, outside intruders will still be prohibited from intercepting and decrypting communications between the target client device 108 and the other client device 112. Only the LEA 106 will be able to decrypt the legally intercepted communications, since the encryption between the client devices 108 and 112 during the LI mode is as strong as the encryption between the client devices 108 and 112 during the non-LI mode.

As mentioned above, an example key-negotiation process may be a Diffie-Hellman key exchange. The following is given for the purposes of providing an exemplary use of terminology, in accordance with at least one embodiment. Suppose Alice and Bob want to engage in cryptographic communication. Alice and Bob may first agree on a modulus p and a base g. Alice may then generate her secret key a, which is known only to her. Alice may then generate a first intermediate value $A=g^a \bmod p$, and share the first intermediate with Bob. Likewise, Bob may choose his own respective secret key b, and send Alice a second intermediate value $B=g^b \bmod p$. Alice may then compute the negotiated session key $s=B^a \bmod p$, while Bob similarly computes the negotiated session key $s=A^b \bmod p$. As an interceptor does not know either of the secret keys a or b, there is no way for the interceptor to obtain the negotiated session key s.

Embodiments described herein provide a pseudorandom means for the intercept secure encryption element associated with the LEA 106 to generate the same pseudorandom secret key as will be generated by the target secure encryption element 304 associated with the target client device 108. Thus, if Alice has the target client device 108 and is being monitored, the LEA 106 may generate Alice's secret key a in a predictable manner when the target secure encryption element 304 is operating in the LI mode. Armed with that information, the LEA 106 can also generate the session key that is negotiated between Alice and Bob, just as Alice clearly can. The LEA 106 can therefore successfully decrypt the communications between Alice (who is using the target client device 108) and Bob (who is using the other client device 112) using a combination of the secret key that Alice will generate and one or more of the session-negotiation messages exchanged between Alice and Bob (and also intercepted by the LEA 106).

Figure 4:
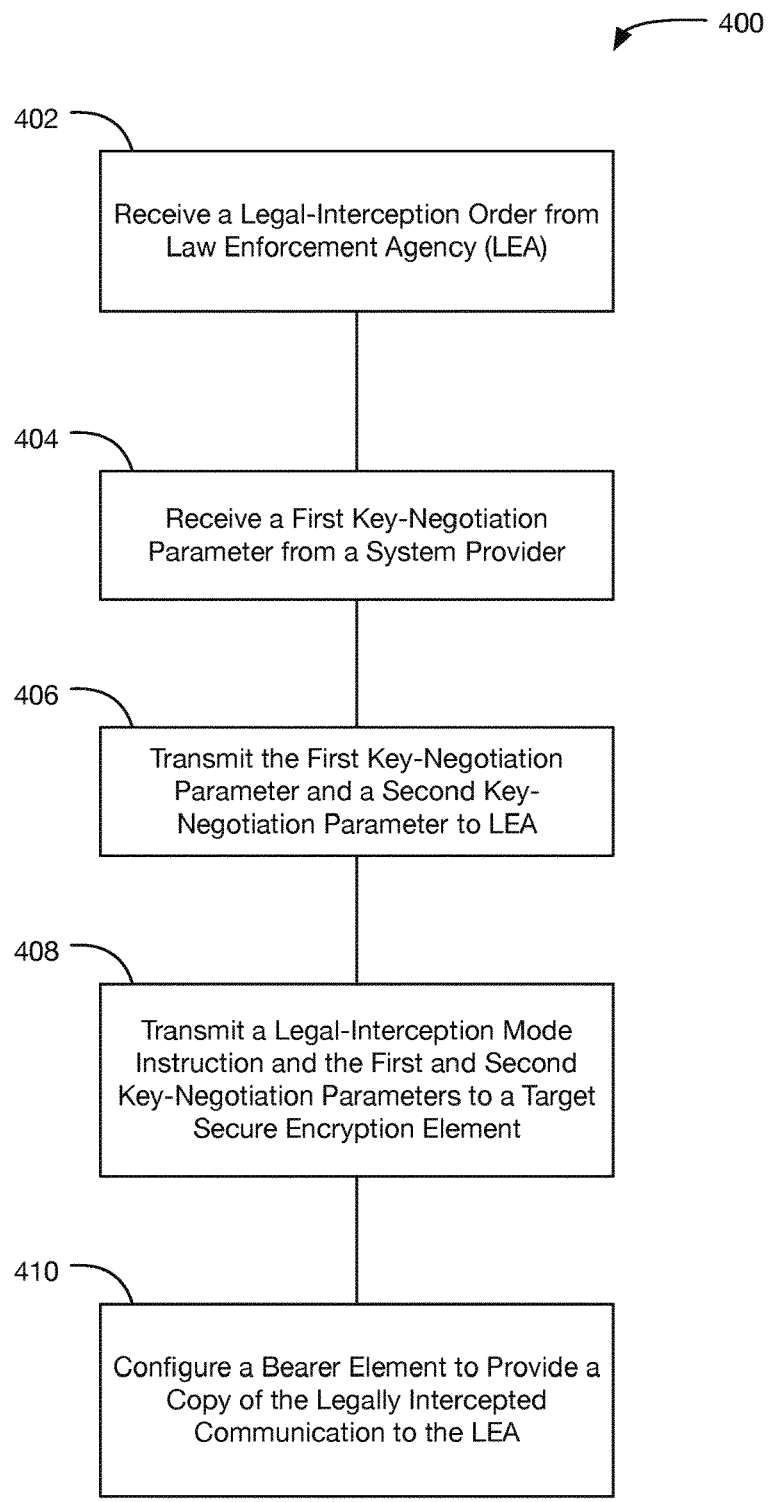
FIG. 4 depicts a flowchart of a method, in accordance with some embodiments.

FIG. 4 illustrates a flowchart of a method 400, in accordance with some embodiments. As shown, a method 400 is carried out by a service provider (e.g., by a service-provider system associated with a service-provider organization that provides a communication service to a plurality of client devices including a target client device).

The method begins at step 402 with the service provider receiving an LI order from an LEA, where the legal-interception order specifies one or more LI-order parameters including a subscriber identifier associated with the target client device.

At step 404, the service provider receives a first key-negotiation parameter from a first organization in connection with the LI order. The first organization is separate and distinct from the service-provider organization, and each of the first organization and the service-provider organization are separate and distinct from the law-enforcement agency.

At step 406, the service provider transmits the first key-negotiation parameter and a second key-negotiation parameter to the LEA for use in legal interception of communication associated with the target client device pursuant to the LI order.

At step 408, the service provider transmits an LI-mode instruction to a target secure encryption element associated with the target client device for causing the target secure encryption element to transition from a first mode to an LI mode. In some embodiments, the service provider is configured to provide the first and second key-negotiation parameters to the target secure encryption element associated with the target client device, while in alternative embodiments the target secure encryption element of the target client device is preconfigured with the first and second key-negotiation parameters. The target secure encryption element, when operating in the LI mode, engages in communication that is encrypted in a predictable manner based on the first and second key-negotiation parameters.

At step 410, the service provider configures a bearer element to provide a copy of the legally intercepted communication associated with the target client device to the LEA for decryption of the legally intercepted communication by the LEA in the predictable manner based on the first and second key-negotiation parameters.

In some embodiments, the communication service includes voice service, and the legally intercepted communication includes voice communication. In some embodiments, the voice service comprises packet-switched voice service.

In some embodiments, the one or more specified LI-order parameters further includes an LI time limitation. In some embodiments, the one or more specified LI-order parameters further includes one or more communication-application services. In some embodiments, the one or more communication-application services includes one or more of telephony, packet-based telephony, Internet telephony, instant messaging, and video chat.

In some embodiments, the legally intercepted communication comprises metadata. In some embodiments, the legally intercepted communication comprises media data.

In some embodiments, the subscriber identifier includes a telephone number. In some embodiments, the subscriber identifier includes an international mobile subscriber identity IMSI. In some embodiments, the subscriber identifier includes a SIP address.

In some embodiments, the first organization is a system provider of a cryptographic target secure encryption element in use in connection with the target client device.

In some embodiments, subsequent to receiving the LI order from the LEA and prior to receiving the first key-negotiation parameter from the first organization, the service provider transmits a first-parameter request to the first organization in connection with the LI order, where the first-parameter request is cryptographically signed by the service-provider organization.

In some embodiments, both the first and second key-negotiation parameters are specific to the particular LI order.

In some embodiments, receiving the first key-negotiation parameter from the first organization includes receiving a first data communication from the first organization, where the first data communication includes the first key-negotiation parameter, and the service provider also generates a second data communication that includes both the first and second key-negotiation parameters, and transmitting the first and second key-negotiation parameters to the LEA includes transmitting the second data communication to the LEA.

In some embodiments, receiving the first key-negotiation parameter from the first organization includes receiving an intercept secure encryption element from the first organization, where the intercept secure encryption element includes the first key-negotiation parameter, and the service provider also modifies the intercept secure encryption element at least in part by storing the second key-negotiation parameter on the intercept secure encryption element, and transmitting the first and second key-negotiation parameters to the LEA includes transmitting the modified intercept secure encryption element to the LEA. In some embodiments, the intercept secure encryption element is a microSD card.

In some embodiments, engaging in communication that is encrypted in the predictable manner includes generating secret keys according to a known function. In some embodiments, the predictable manner includes iterating through a predefined sequence of secret keys. In some embodiments, the predictable manner includes using a known function to generate a table index, and using secret keys from a predetermined table of secret keys according to the generated table index.

In some embodiments, the bearer element includes a SIP server. In some embodiments, the bearer element includes a service-provider-network head end. In some embodiments, the bearer element includes a media server. In some embodiments, the bearer element includes a media gateway.

In some embodiments, the LEA decrypts the legally intercepted communication using a decryption tool that is provided to the LEA by the first organization (e.g., by the system provider).

Figure 5:
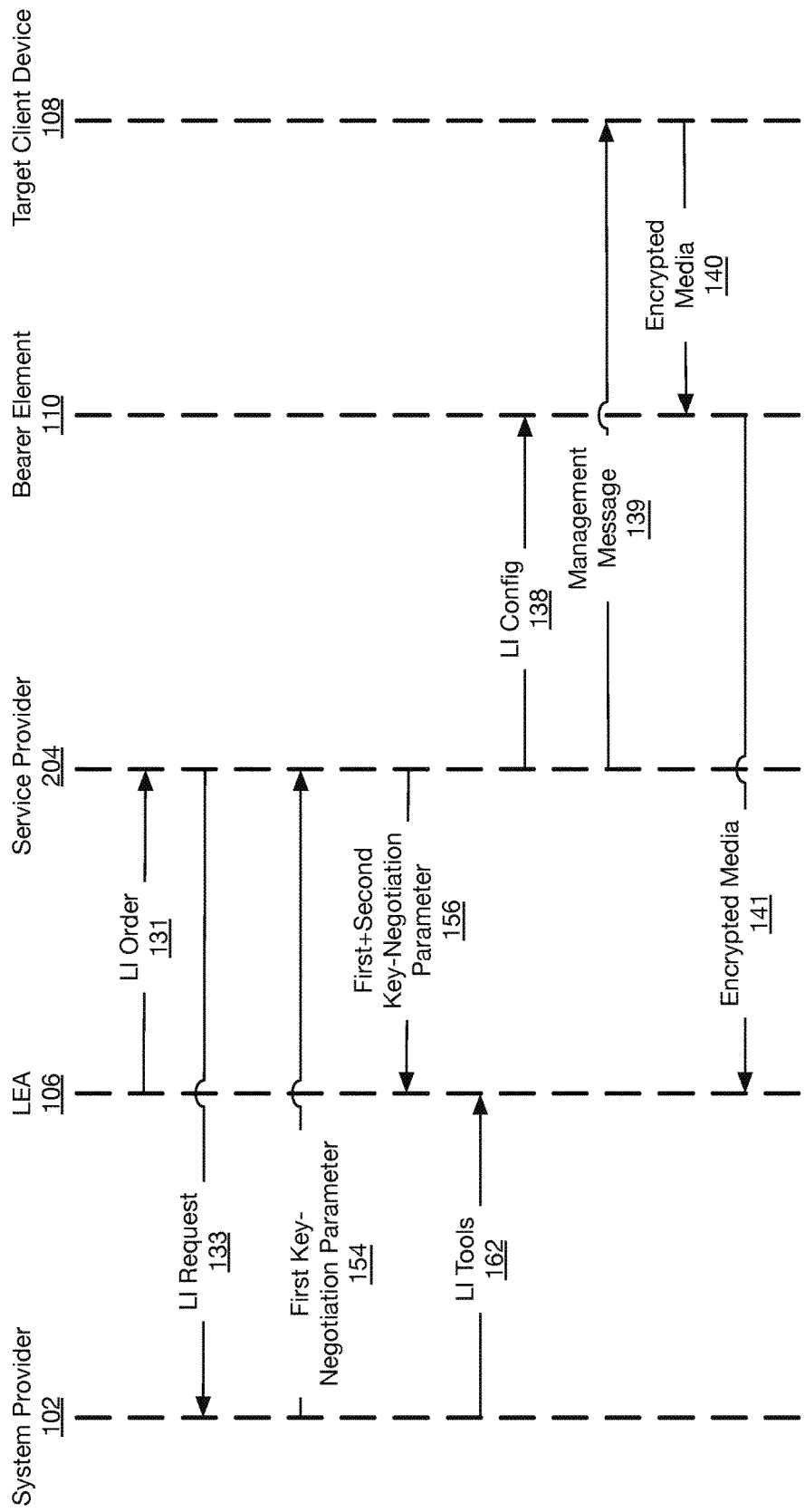
FIG. 5 depicts a call-flow diagram, in accordance with some embodiments.

FIG. 5 depicts a call-flow diagram, in accordance with some embodiments. In this and the other call-flow diagrams, the numbering corresponds with the numbering that is used above in FIGS. 1A, 1B, 1C, and 2. As shown, the service provider 204 receives an LI order from the LEA 106 at 131. Subsequently, the service provider 204 provides a first-parameter request to the system provider 102 at 133, and in response receives a first key-negotiation parameter at 154 from the system provider 102. The service provider 104 provides the first and a second key-negotiation parameters to the LEA 106 at 156, while the system provider 102 also provides LI tools to the LEA 106 at 162.

At 138, the service provider 204 configures the bearer element 110 to provide a copy of the legally intercepted communication associated with the target client device 108 to the LEA 106 for decryption of the legally intercepted communication by the LEA 106 in the predictable manner based at least in part on the first and second key-negotiation parameters. The service provider 104 sends a management message at 139, where the management message includes an LI-mode instruction to the target secure encryption element 304 associated with the target client device 108 for causing the target secure encryption element 304 to transition from a first mode to an LI mode. In some embodiments, the management message includes the first and second key-negotiation parameters, while in alternative embodiments the first and second key-negotiation parameters are preconfigured on the target secure encryption element 304 of the target client device 108.

The target secure encryption element 304, when operating in the LI mode, engages in communication that is encrypted in a predictable manner based on the first and second key-negotiation parameters. As the target client device 108 sends encrypted media to the bearer element 110 at 140, the LEA 106 may receive a copy of the encrypted data 141 and decrypt the encrypted data using the LI tools and a negotiated session key obtained at least in part using the first and second key-negotiation parameters. As the LEA 106 is the only entity among the LEA 106, the system provider 102, and the service provider 204 to have both (i) the LI tools and (ii) both the first and second key-negotiation parameters, the LEA 106 is the only entity that can decrypt the encrypted data. In some embodiments, the LEA 106 reconstructs a negotiated session key used in a communication session between the target client device 108 and the other client device 112 using the first and second key-negotiation parameters and messages intercepted during a key-negotiation process. In such embodiments, the LEA 106 decrypts the encrypted data using the reconstructed negotiated session key.

Figure 6A:
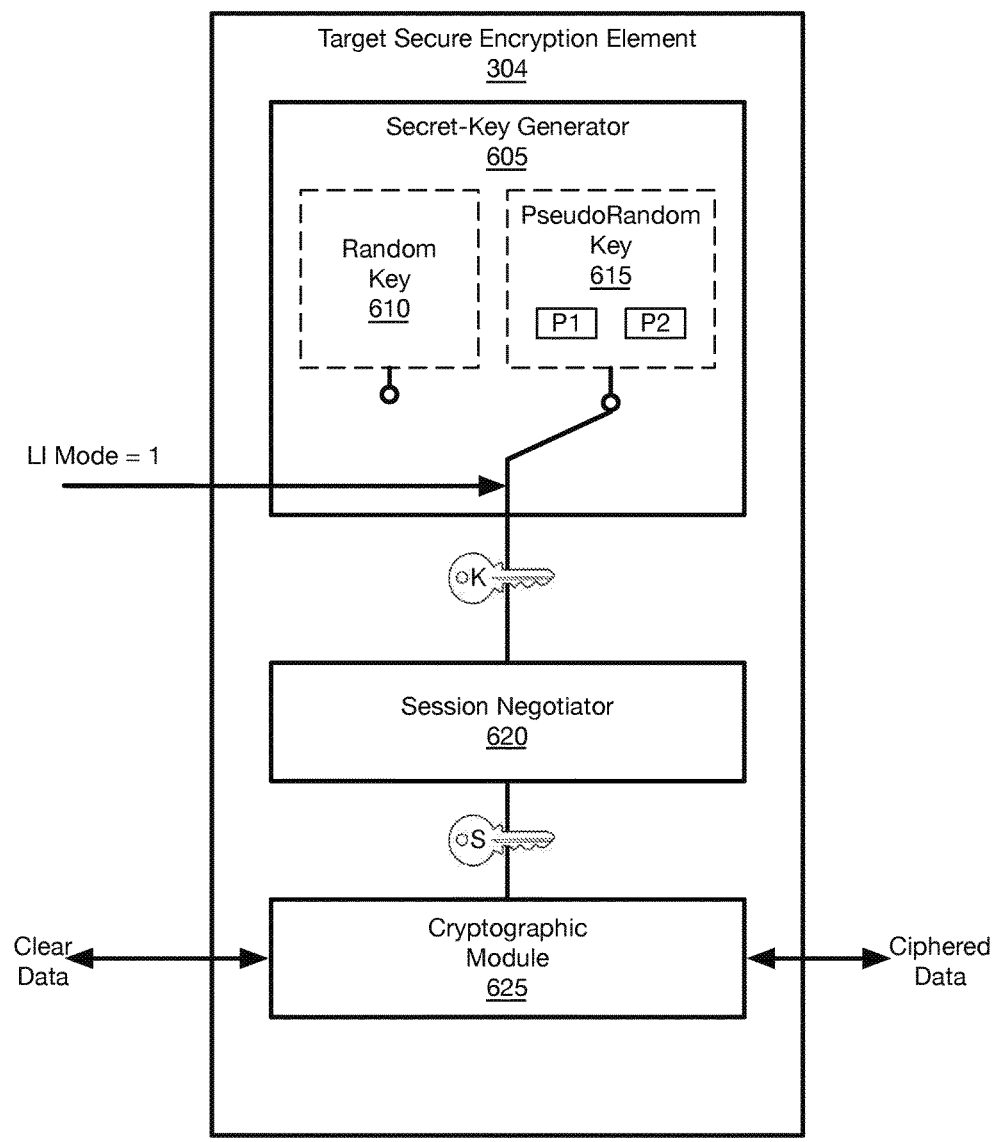
FIGS. 6A and 6B depict block diagrams of a target secure encryption element, in accordance with some embodiments.
Figure 6B:
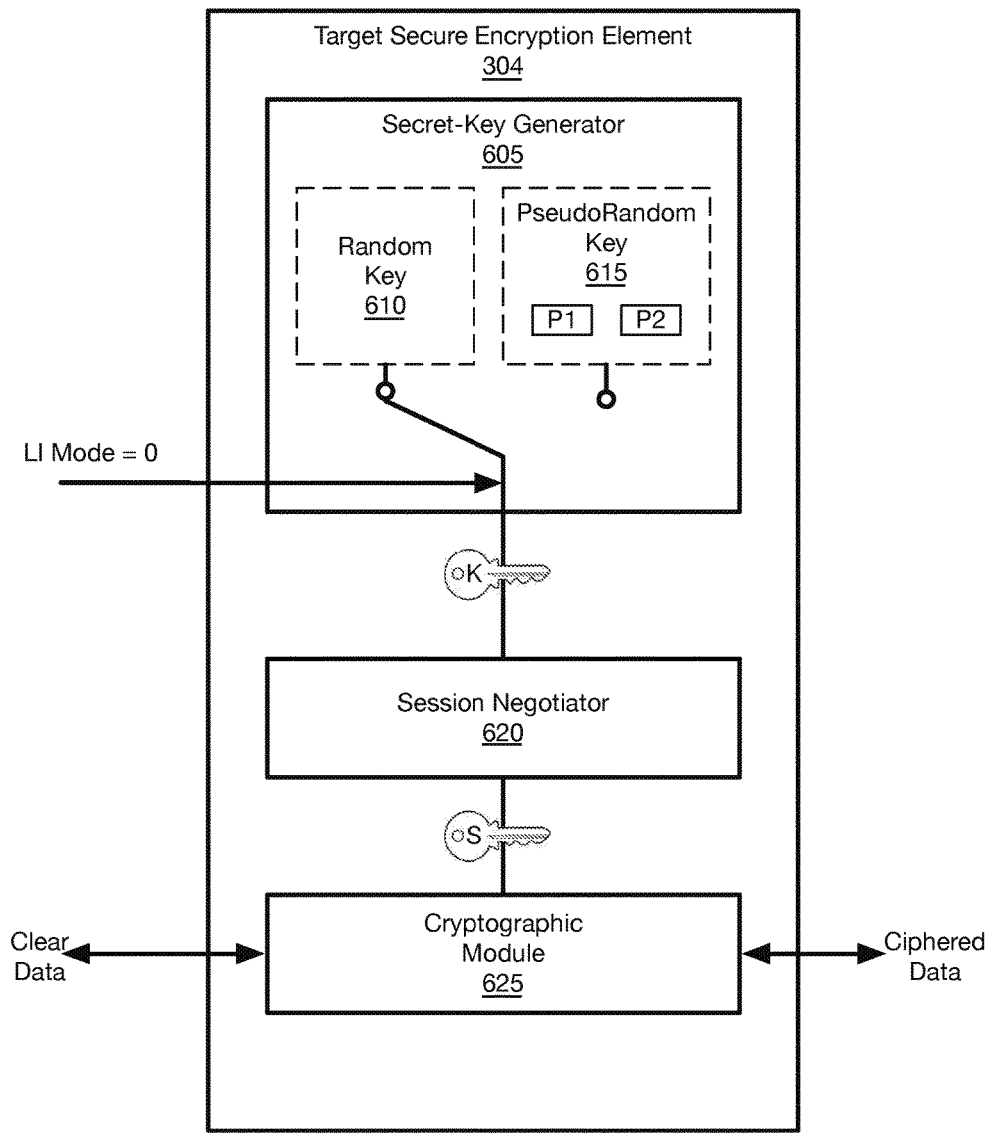

FIGS. 6A and 6B depict block diagrams of the target secure encryption element 304, in accordance with some embodiments. As shown, FIG. 6A includes a secret-key generator 605, a session-negotiator module 620, and a cryptographic module 625. Further, the secret-key generator 605 includes a random key generator 610 and a pseudo-random key generator 615. In some embodiments, when an LI order is received, the target secure encryption element 304 receives an intercept-mode command 'LI Mode'=1. In response, the secret-key generator 605 begins providing pseudo-random secret keys for the duration of the legal-intercept session.

In some embodiments, the pseudo-random key generator 615 uses the first and second key-negotiation parameters P1 and P2, respectively. In some embodiments, the target secure encryption element 304 is preconfigured with the first and second key-negotiation parameters P1 and P2. In alternative embodiments, target secure encryption element 304 receives the first and second key-negotiation parameters upon receiving the LI-mode instruction. In some embodiments, the target secure encryption element 304 uses a Diffie-Hellman-type key exchange with another device. In such embodiments, the secret keys generated using the secret-key generator 605 may be referred to as secret keys 'K'. The session-negotiator module 620 receives the pseudo-random secret key 'K', and generates a negotiated session key 'S' to use for encryption for a given session based on pseudo-random secret key 'K' as well as an intermediate value received from the other client device, as is Diffie-Hellman protocol.

The cryptographic module 625 receives the session key 'S', and can encrypt clear data entering the target secure encryption element 304, as well as decrypt ciphered data entering the target secure encryption element 304. In some embodiments, the cryptographic module 625 may utilize an Encryption Standard AES algorithm, a Blowfish algorithm, a Data Encryption Standard DES algorithm, a Triple DES algorithm, a Serpent algorithm, or a Twofish algorithm. Alternatively, the cryptographic module 625 may also use non-published encryption algorithms. Further, the target secure encryption element 304 may perform authentication processes using elliptic curve digital signature algorithms (ECDSA), for example. In some embodiments, authentication processes may incorporate headers, indexes, synchronization-source (SSRC) values, etc. into encryption. Further, authentication tags may be generated using algorithms such as AES in order to provide an integrity check for a receiving device. In some embodiments, the target secure encryption element 304 may receive authentication tags and the like to verify the integrity of received ciphered packets. The above embodiment describes the use of Diffie-Hellman key exchange procedures; however, it should be noted that various other types of procedures may be used as well.

In some embodiments, the pseudo-random key generator 615 may use a periodic pseudorandom number generator PRNG. In some embodiments, the pseudo-random key generator 615 may use a Mersenne Twister algorithm. In some embodiments, the pseudo-random key generator may use a cryptographically secure PNRG, such as stream ciphers, block ciphers, PRNGs such as the Yarrow algorithm, combination PRNGs, as well as various other pseudorandom number generators.

In some embodiments, generating a pseudo-random key includes using a function that receives the first and second key-negotiation parameters as inputs, and outputs the pseudo-random secret key. For example, there may be a predefined table of pseudo-random secret keys known by the target secure encryption element and the intercept secure encryption element. Each secure encryption element may start at the same index upon entering legal-intercept mode, and the pseudo-random key generator may add the first and second key-negotiation parameters using circular addition (or modulo reduction) in order to obtain the pseudo-random secret key. On a subsequent communications session, each secure encryption element may start at the previously obtained index, and perform the same circular addition/modulo reduction in order to insure that the same pseudo-random secret key is not used for each communications session. And certainly other examples of predictable functions could be listed here as well.

FIG. 6B depicts a second view of the target secure encryption element 304, however the LI session has ended, and the target secure encryption element 304 has received an intercept mode command 'LI Mode'=0, and thus the secret-key generator 605 switches back to obtaining secret keys from random key generator 610.

It should be noted that the intercept secure encryption element used by the LEA 106 might have a similar architecture as the target secure encryption element 304. For example, it may use the same pseudo-random key generator 615, as well as a similar session negotiation module 620 and a similar cryptographic module 625. In some embodiments, the intercept secure encryption element may always be configured in LI mode, or more generally, may only have one mode being the LI mode.

Figure 7:
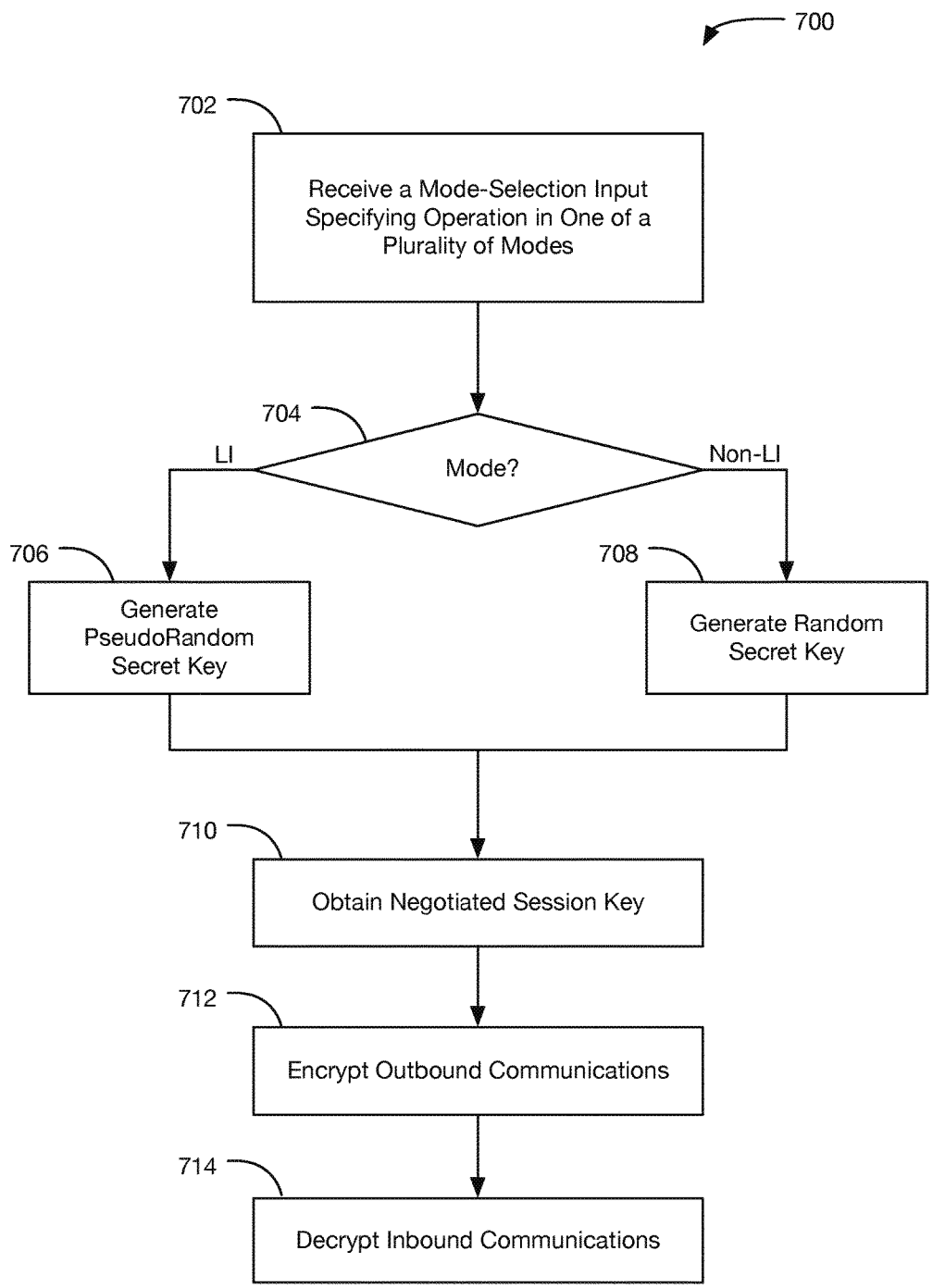
FIG. 7 depicts a flowchart of a method, in accordance with some embodiments.

FIG. 7 is a flowchart of a method 700, in accordance with some embodiments. The method 700 may be carried out by the target secure encryption element 304 and/or the target client device 308 in various different embodiments. The method 700 is described by way of example and not limitation as being carried out by the target secure encryption element 304.

At step 702, the target secure encryption element 304 receives a mode-selection input specifying operation in one of a plurality of modes, the plurality of modes including a normal-operation mode and a legal-intercept mode. At step 704, the target secure encryption element 304 checks which mode is specified by the mode-selection input received at step 702. If it is normal-operation (i.e., non-LI) mode, the target secure encryption element 304 generates random secret keys, whereas if it is the LI mode, the pseudo-random secret keys are generated as described herein.

At step 710, the target secure encryption element 304 passes the secret keys are passed to the session-negotiator module 620, which identifies (e.g., derives) a negotiated session key, which may be based on the secret keys and an intermediate value received from a second client device. At step 712, the target secure encryption element 304 encrypts outbound communications. Further, at step 714, the target secure encryption element 304 decrypts inbound communications. In some embodiments, the inbound communications are decrypted using a negotiated session key obtained at least in part by using first and second key-negotiation parameters to obtain a pseudo-random secret key used by a target client device, and by intercepting key-negotiation messages between the target client device and a second client device to reconstruct the negotiated session key. Once the negotiated session key is obtained, it may be used to decrypt inbound encrypted communications.

Figure 8:
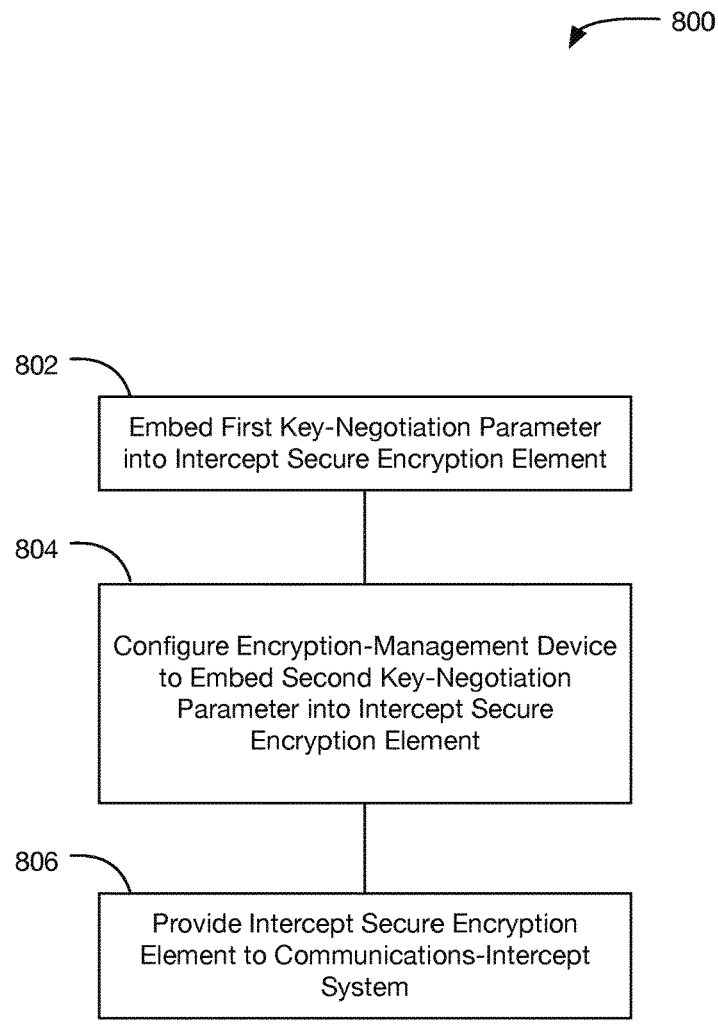
FIG. 8 depicts a flowchart of a method, in accordance with some embodiments.

FIG. 8 is flowchart of a method 800 in accordance with some embodiments. At step 802, a first key-negotiation parameter associated with the target client device 108 is embedded into an intercept secure encryption element. At step 804, an encryption-management device is configured to receive the intercept secure encryption element and to receive a second key-negotiation parameter associated with the target client device and obtained from a service-provider system. The encryption-management device may be configured to embed the second key-negotiation parameter into the intercept secure encryption element. At step 806, the intercept secure encryption element is provided to a communications-intercept system (e.g., the LEA 106) that is configured to obtain intercepted messages associated with the target client device 108. The intercepted messages may include session-key-negotiation messages and associated data messages that are encrypted with a corresponding negotiated session key, and the intercept secure encryption element is configured to (i) identify the negotiated session key based on the session-key-negotiation messages and the first and second key-negotiation parameters and (ii) decrypt the data messages with the negotiated session key.

In some embodiments, the method further includes configuring the encryption-management device to provide the first and second key-negotiation parameters to the target secure encryption element 304 that is associated with the target client device 108.

In some embodiments, a target secure encryption element 304 associated with the target client device 108 is preconfigured with the first and second key-negotiation parameters.

In some embodiments, the negotiated session key is based on a first secret key associated with the target client device 108 and a second secret key associated with a second client device (e.g., the other client device 112), where a target secure encryption element 304 that is associated with the target client device 108 is selectively configured to use, as the first secret key, a pseudorandom secret key that is based on the first and second key-negotiation parameters. In some embodiments, each of the target secure encryption element 304 and the intercept secure encryption element is configured with a respective pseudorandom generator 615 that generates the pseudorandom secret key based on the first and second key-negotiation parameters. In some embodiments, the method further includes transmitting a configuration command to the target secure encryption element to selectively configure the target secure encryption element to generate the pseudorandom secret key. In some embodiments, either or both of the target secure encryption element 304 and the intercept secure encryption element have at least one tamper-resistant safeguard.

In some embodiments, the method further includes configuring the encryption-management device to obtain the second key-negotiation parameter from the service-provider system responsive to receiving the intercept secure encryption element.

In some embodiments, the method further includes configuring the encryption-management device to obtain the second key-negotiation parameter via a user interface.

Figure 9:
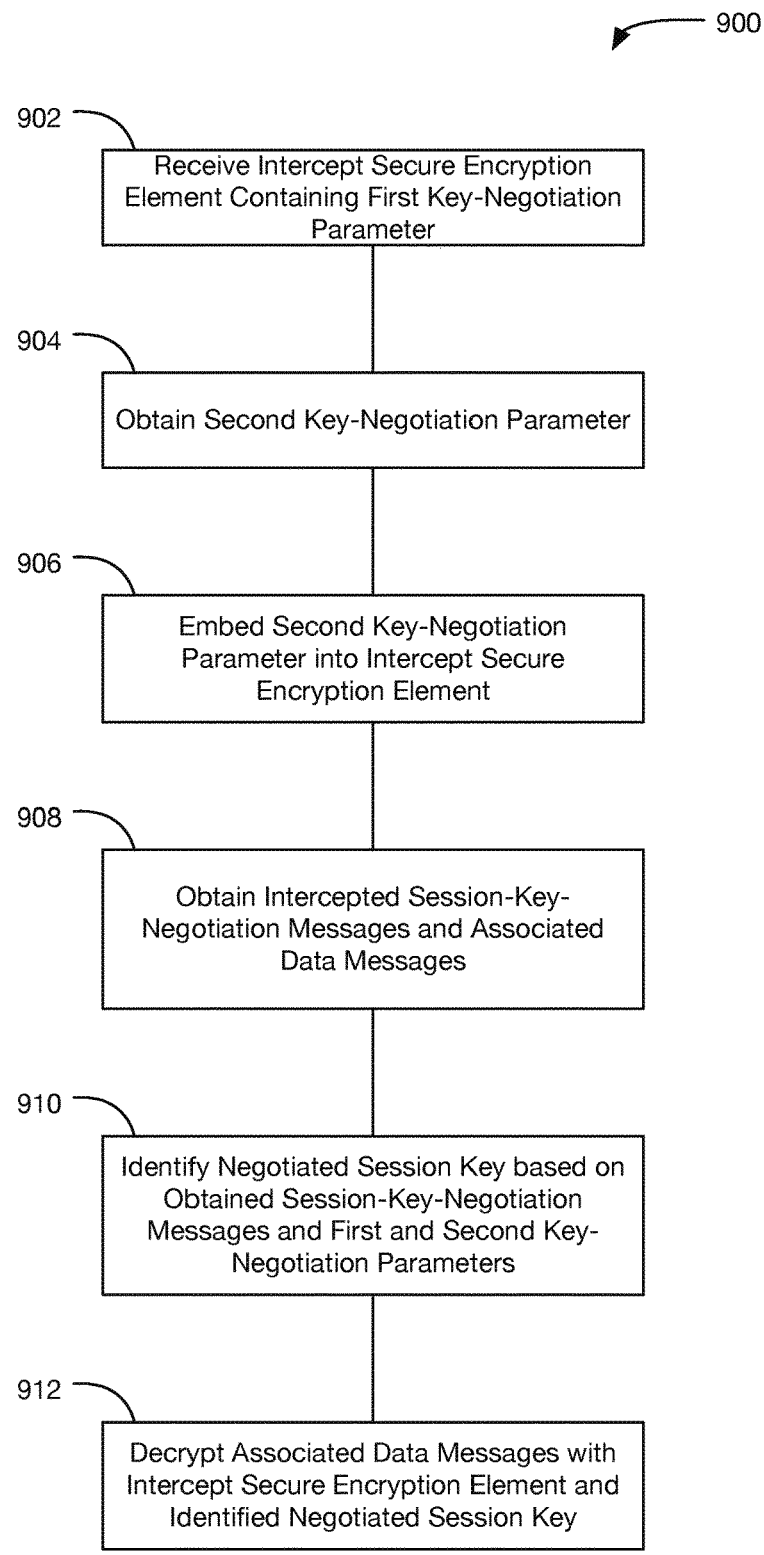
FIG. 9 depicts a flowchart of a method, in accordance with some embodiments.

FIG. 9 depicts a flowchart of a method 900, in accordance with some embodiments. In some embodiments, the service provider 204 and the LEA 106 as described above may in combination carry out the method 900. As shown, method 900 includes the steps of receiving, at step 902, an intercept secure encryption element containing an embedded first key-negotiation parameter associated with the target client device 108; obtaining, at step 904, from a service-provider system, a second key-negotiation parameter associated with the target client device 108; embedding, at step 906, the second key-negotiation parameter into the intercept secure encryption element; obtaining, at step 908, intercepted messages associated with the target client device 108, the intercepted messages comprising session-key-negotiation messages and associated data messages encrypted with a corresponding negotiated session key; identifying, at step 910, with the intercept secure encryption element, the negotiated session key based on the session-key-negotiation messages and the first and second key-negotiation parameters; and decrypting, at step 912, the data messages with the intercept secure encryption element and the negotiated session key.

In some embodiments, the method further includes providing the first and second key-negotiation parameters to the target secure encryption element 304 associated with the target client device 108.

In some embodiments, the target secure encryption element 304 associated with the target client device 108 is preconfigured with the first and second key-negotiation parameters.

In some embodiments, the negotiated session key is based on a first secret key associated with the target client device 108 and a second secret key associated with a second client device (e.g., the other client device 112), where the target secure encryption element 304 associated with the target client device 108 is selectively configured to use, as the first secret key, a pseudorandom secret key that is based on the first and second key-negotiation parameters. In some embodiments, each of the target secure encryption element 304 and the intercept secure encryption element is configured with a respective pseudorandom generator 615 that generates the pseudorandom secret key based on the first and second key-negotiation parameters. In some embodiments, the method further includes transmitting a configuration command to the target secure encryption element 304 to selectively configure the target secure encryption element 304 to generate the pseudorandom secret key.

In some embodiments, either or both of the target secure encryption element 304 and the intercept secure encryption element have at least one tamper-resistant safeguard.

In some embodiments, the second key-negotiation parameter is obtained from the service-provider system responsive to receiving the intercept secure encryption element.

Figure 10:
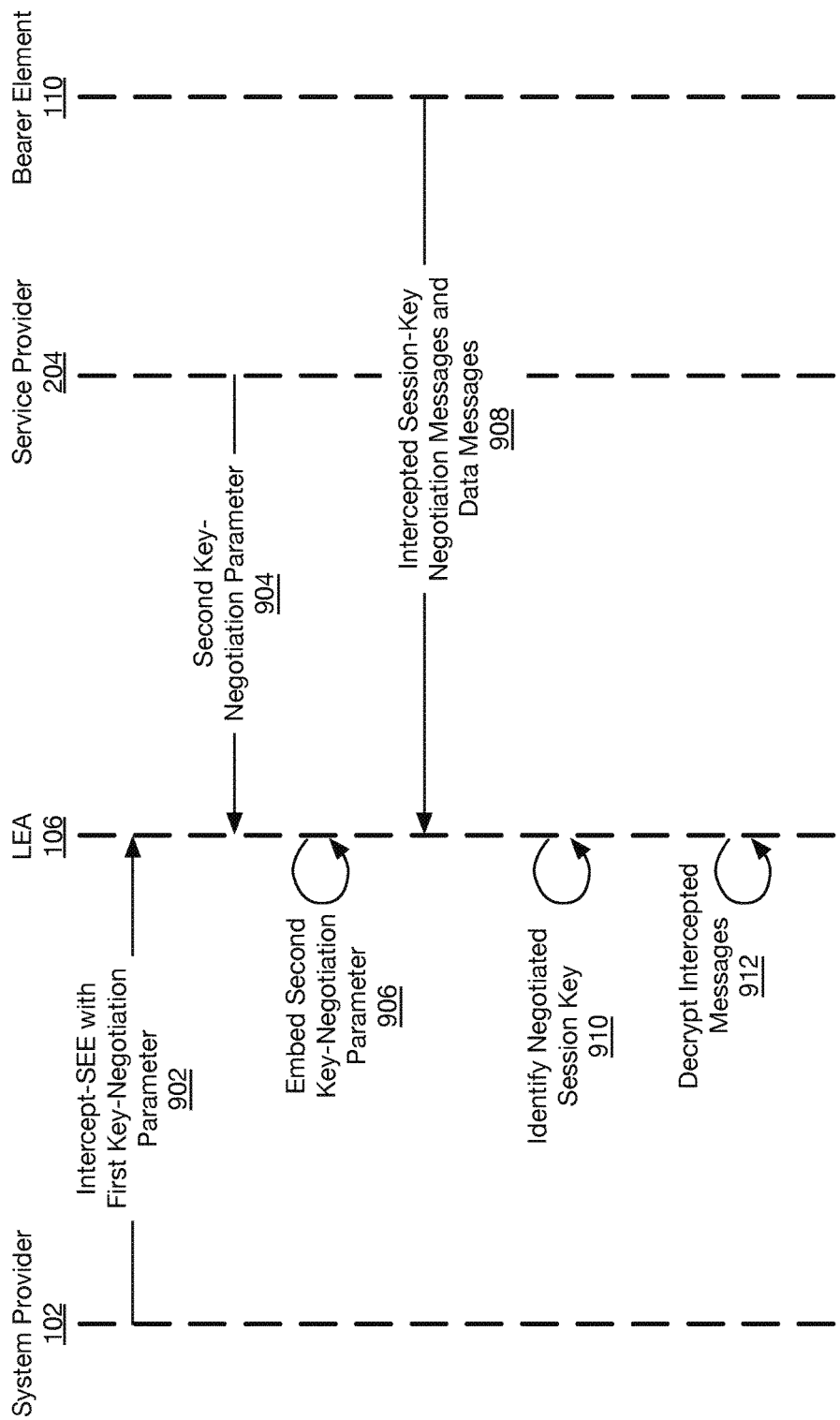
FIG. 10 depicts a call-flow diagram, in accordance with some embodiments.

FIG. 10 is a call-flow diagram illustrating a process, in accordance with the method 900 of FIG. 9. As shown, the intercept secure encryption element with the first key-negotiation parameter is received by the LEA 106 at 902. The LEA 106 receives the second key-negotiation parameter at 904 from the service provider 204. The LEA 160 then embeds the second key-negotiation parameter into the intercept secure encryption element at 906. At 908, intercepted session-key-negotiation messages and associated data messages are received by the LEA 106 from the bearer element 110. The LEA 106 identifies the negotiated session key at 910, and decrypts intercepted messages at 912. It should be noted that the reference numerals 902-912 in FIG. 10 correspond to the reference numerals 902-912 in FIG. 9.

Figure 11:
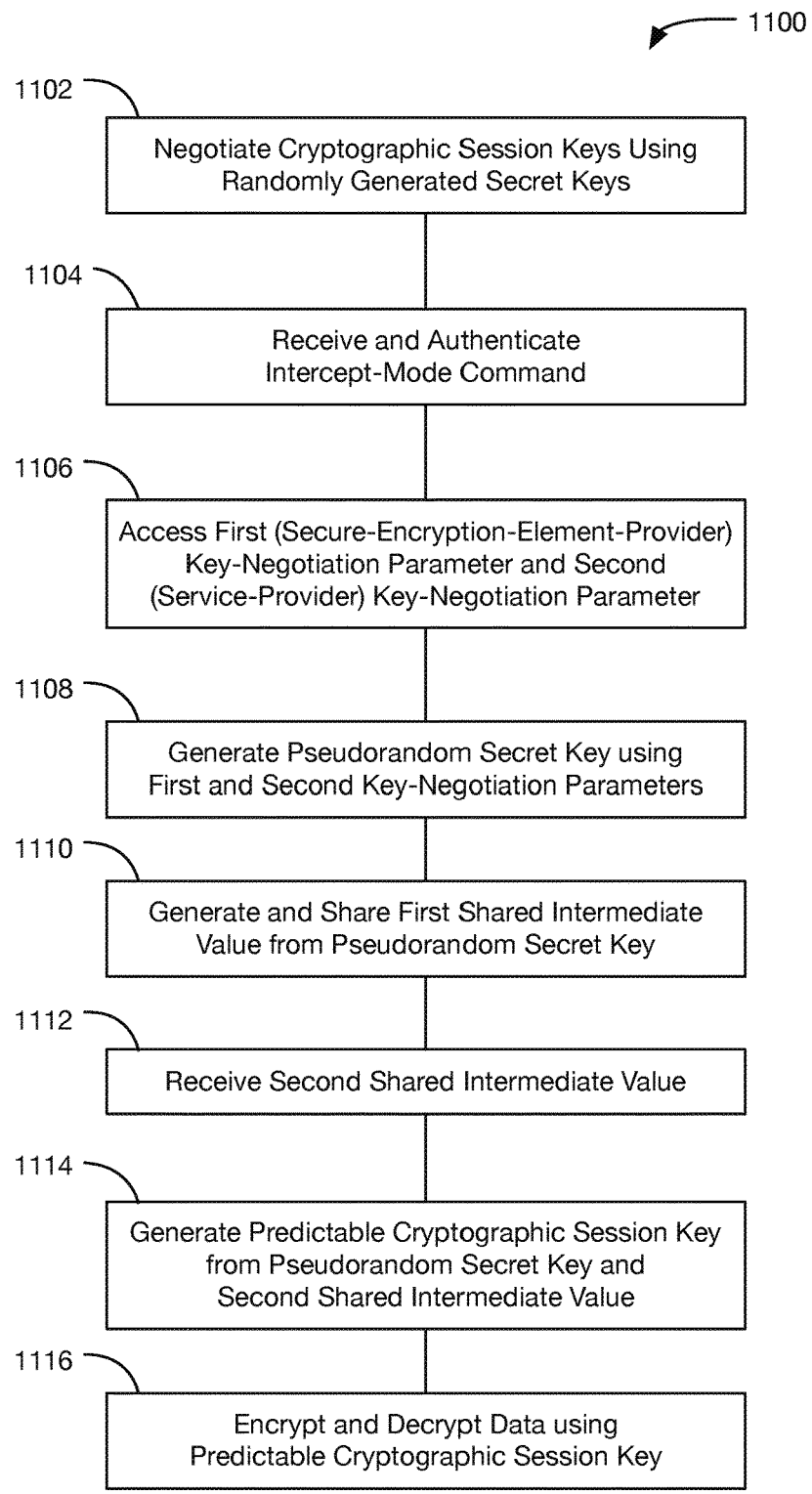
FIG. 11 depicts a flowchart of a method, in accordance with some embodiments.

FIG. 11 is a flowchart of a method 1100, in accordance with some embodiments. In some embodiments, the method 1100 may be carried out by the target secure encryption element 304. At step 1102, the target secure encryption element 304 negotiates cryptographic session keys with remote devices using randomly generated secret keys, and encrypts and decrypts data with those negotiated session keys during communication sessions with those remote devices. At step 1104, the target secure encryption element 304 receives and authenticates an LI-mode command, and responsively negotiating a predictable cryptographic session key at least in part by carrying out the below-described steps 1106-1116.

At step 1106, the target secure encryption element 304 accesses a first key-negotiation parameter originating in a secure-encryption-element provider and a second key-negotiation parameter originating in a service provider. At step 1108, the target secure encryption element 304 generates a pseudorandom secret key based on the first and second key-negotiation parameters. At step 1110, the target secure encryption element 304 generates and shares a first shared intermediate value based on the pseudorandom secret key.

At step 1112, the target secure encryption element 304 receives a second shared intermediate value. At step 1114, the target secure encryption element 304 generates the predictable cryptographic session key based on the pseudorandom secret key and the second shared intermediate value. At step 1116, the target secure encryption element 304 encrypts and decrypts data with the generated predictable cryptographic session key during a communication session with a remote device.

In some embodiments, the first shared intermediate value is generated using a discrete-logarithm function or an elliptical-curve function. In some embodiments, the discrete-logarithm function includes an exponential multiplication of the pseudorandom secret key into a product, followed by a modulo reduction of the product.

Figure 12:
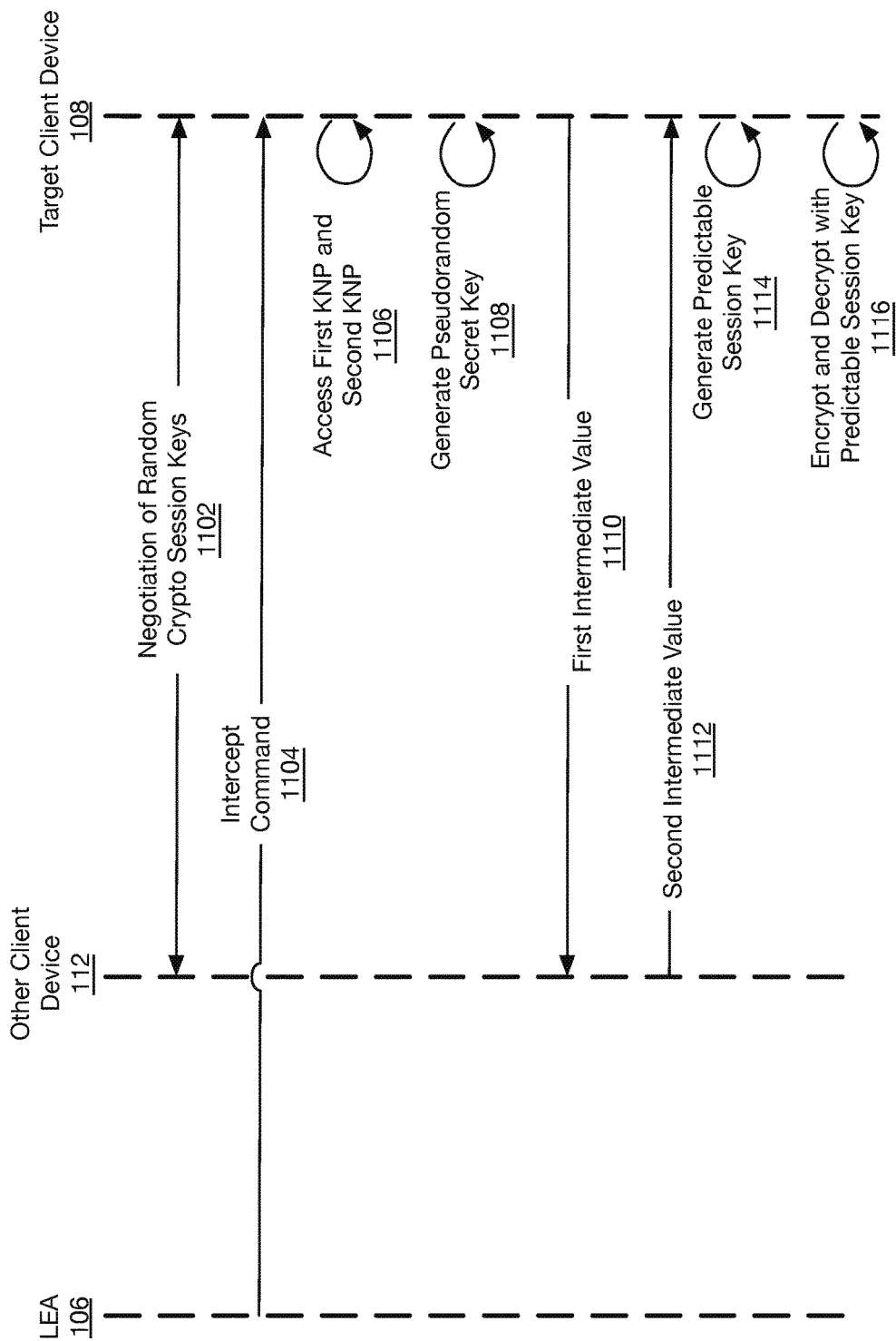
FIG. 12 depicts a call-flow diagram, in accordance with some embodiments.

FIG. 12 is a call-flow diagram in accordance with the method 1100 of FIG. 11, in accordance with some embodiments. As shown at 1102, the target client device 108 and the other client device 112 are engaging in cryptographic communications using random cryptographic session keys. Upon receiving an intercept command at 1104, the target client device 108 may access the first and second key-negotiation parameters at 1106. The target secure encryption element 304 associated with target client device 108 may generate pseudorandom secret keys at 1108, generate and share a first intermediate value at 1110, and receive a second intermediate value from the other client device 112 at 1112. The target secure encryption element 304 may then generate a predictable session key at 1114, and encrypt and decrypt data at 1116. It should be noted that the reference numerals 1102-1116 in FIG. 12 correspond to the reference numerals 1102-1116 in FIG. 11.

Although features and elements are described above in particular combinations, those having ordinary skill in the art will appreciate that each feature or element can be used alone or in any combination with the other features and elements without departing from the scope and spirit of the present disclosure. Embodiments described in the form of a method may have analogous system embodiments, and vice versa.

What is claimed is:

1. A method comprising:
embedding a first key-negotiation parameter associated with a target client device into an intercept secure encryption element;
configuring an encryption-management device to receive the intercept secure encryption element and to receive a second key-negotiation parameter associated with the target client device and obtained from a service-provider system, the encryption-management device configured to embed the second key-negotiation parameter into the intercept secure encryption element; and
providing the intercept secure encryption element to a communications-intercept system configured to obtain intercepted messages associated with the target client device, the intercepted messages comprising session-key-negotiation messages and associated data messages encrypted with a corresponding negotiated session key, wherein the intercept secure encryption element is configured to (i) identify the negotiated session key based on the session-key-negotiation messages and the first and second key-negotiation parameters and (ii) decrypt the data messages with the negotiated session key.

2. The method of claim 1, further comprising configuring the encryption-management device to provide the first and second key-negotiation parameters to a target secure encryption element associated with the target client device.

3. The method of claim 1, wherein a target secure encryption element associated with the target client device is preconfigured with the first and second key-negotiation parameters.

4. The method of claim 1, wherein the negotiated session key is based on a first secret key associated with the target client device and a second secret key associated with a second client device, wherein a target secure encryption element associated with the target client device is selectively configured to use, as the first secret key, a pseudorandom secret key that is based on the first and second key-negotiation parameters.

5. The method of claim 4, wherein each of the target secure encryption element and the intercept secure encryption element is configured with a respective pseudorandom generator that generates the pseudorandom secret key based on the first and second key-negotiation parameters.

6. The method of claim 4, further comprising transmitting a configuration command to the target secure encryption element to selectively configure the target secure encryption element to generate the pseudorandom secret key.

7. The method of claim 4, wherein either or both of the target secure encryption element and the intercept secure encryption element have at least one tamper-resistant safeguard.

8. The method of claim 1, further comprising configuring the encryption-management device to obtain the second key-negotiation parameter from the service-provider system responsive to receiving the intercept secure encryption element.

9. The method of claim 1, further comprising configuring the encryption-management device to obtain the second key-negotiation parameter via a user interface.

10. A method comprising:
receiving an intercept secure encryption element containing an embedded first key-negotiation parameter associated with a target client device;
obtaining, from a service-provider system, a second key-negotiation parameter associated with the target client device;
embedding the second key-negotiation parameter into the intercept secure encryption element;
obtaining intercepted messages associated with the target client device, the intercepted messages comprising session-key-negotiation messages and associated data messages encrypted with a corresponding negotiated session key;
identifying, with the intercept secure encryption element, the negotiated session key based on the session-key-negotiation messages and the first and second key-negotiation parameters; and
decrypting the data messages with the intercept secure encryption element and the negotiated session key.

11. The method of claim 10, further comprising providing the first and second key-negotiation parameters to a target secure encryption element associated with the target client device.

12. The method of claim 10, wherein a target secure encryption element associated with the target client device is preconfigured with the first and second key-negotiation parameters.

13. The method of claim 10, wherein the negotiated session key is based on a first secret key associated with the target client device and a second secret key associated with a second client device, wherein a target secure encryption element associated with the target client device is selectively configured to use, as the first secret key, a pseudorandom secret key that is based on the first and second key-negotiation parameters.

14. The method of claim 13, wherein each of the target secure encryption element and the intercept secure encryption element is configured with a respective pseudorandom generator that generates the pseudorandom secret key based on the first and second key-negotiation parameters.

15. The method of claim 13, further comprising transmitting a configuration command to the target secure encryption element to selectively configure the target secure encryption element to generate the pseudorandom secret key.

16. The method of claim 13, wherein either or both of the target secure encryption element and the intercept secure encryption element have at least one tamper-resistant safeguard.

17. The method of claim 10, wherein the second key-negotiation parameter is obtained from the service-provided system responsive to receiving the intercept secure encryption element.

18. A method comprising:
   negotiating cryptographic session keys with remote devices using randomly generated secret keys, and encrypting and decrypting data with the negotiated session keys during communication sessions with the remote devices; and
   receiving and authenticating an intercept-mode command, and responsively negotiating a predictable cryptographic session key at least in part by:
      accessing a first key-negotiation parameter originating in a secure-encryption-element provider and a second key-negotiation parameter originating in a service provider;
      generating a pseudorandom secret key based on the first and second key-negotiation parameters;
      generating and sharing a first shared intermediate value based on the pseudorandom secret key;
      receiving a second shared intermediate value;
      generating the predictable cryptographic session key based on the pseudorandom secret key and the second shared intermediate value; and
      encrypting and decrypting data with the generated predictable cryptographic session key during a communication session with a remote device.

19. The method of claim 18, wherein the first shared intermediate value is generated using a discrete-logarithm function or an elliptical-curve function.

20. The method of claim 19, wherein the discrete-logarithm function comprises an exponential multiplication of the pseudorandom secret key into a product, followed by a modulo reduction of the product.

* * * * *